US008573562B2

(12) United States Patent  
Devine et al.

(10) Patent No.: US 8,573,562 B2  
(45) Date of Patent: Nov. 5, 2013

(54) REMOTE MANIPULATOR FOR MANIPULATING LIVE MULTIPLE SUB-CONDUCTORS IN A SINGLE PHASE BUNDLE

(75) Inventors: Clifford William Devine, Oliver (CA); Daniel Neil O'Connell, Oliver (CA)

(73) Assignee: Quanta Associates, L.P., Houston, TX (US)

( * ) Notice: Subject to any disclaimer, the term of this patent is extended or adjusted under 35 U.S.C. 154(b) by 849 days.

(21) Appl. No.: 12/227,834

(22) PCT Filed: Jun. 2, 2006

(86) PCT No.: PCT/CA2006/000909  
§ 371 (c)(1),  
(2), (4) Date: Apr. 13, 2009

(87) PCT Pub. No.: WO2007/140569  
PCT Pub. Date: Dec. 13, 2007

(65) Prior Publication Data  
US 2009/0206305 A1  Aug. 20, 2009

(51) Int. Cl.  
*B66F 3/00* (2006.01)  
*B63B 35/03* (2006.01)  
*B65H 59/00* (2006.01)  
*E21C 29/16* (2006.01)  
*H02G 1/08* (2006.01)  
*H02G 7/12* (2006.01)  
*F16M 13/00* (2006.01)  
*F16L 3/00* (2006.01)  
*H02G 1/02* (2006.01)

(52) U.S. Cl.  
USPC ............ 254/134; 174/40 R; 248/544; 248/49; 254/134.3 R

(58) Field of Classification Search  
USPC ............ 254/134, 134.3 R; 174/40 R, 40 TD; 248/544, 49, 58, 351  
See application file for complete search history.

(56) References Cited

U.S. PATENT DOCUMENTS

| 4,973,795 | A  | * | 11/1990 | Sharpe .......................... 174/40 R |
|-----------|----|---|---------|----------------------------------|
| 5,107,954 | A  | * | 4/1992  | Fujimoto ...................... 182/2.11 |
| 5,183,168 | A  | * | 2/1993  | Fujimoto ........................ 212/232 |
| 5,538,207 | A  | * | 7/1996  | O'Connell et al. ............. 248/49 |
| 6,837,671 | B2 | * | 1/2005  | Devine et al. ................. 414/680 |
| 7,535,132 | B2 | * | 5/2009  | Devine et al. ................. 307/147 |
| 7,546,680 | B2 | * | 6/2009  | Barthold ......................... 29/745 |
| 8,184,015 | B2 | * | 5/2012  | Lilien et al. .............. 340/870.04 |
| 2008/0246010 | A1 | * | 10/2008 | Barthold ................ 254/134.3 R |
| 2009/0095522 | A1 | * | 4/2009  | Barthold ................... 174/40 TD |

\* cited by examiner

*Primary Examiner* — Lee D Wilson  
*Assistant Examiner* — Alvin Grant  
(74) *Attorney, Agent, or Firm* — Antony C. Edwards

(57) ABSTRACT

A manipulator for separating sub-conductors in an energized single phase bundle includes a rigid support member and first and second actuators mounted on the support member, wherein each actuator is independently actuable of the other. Insulators are mounted on each actuator. A selectively releasable coupler is mounted on each insulator for selectively releasable coupling of each insulator to a corresponding sub-conductor. The actuators extend corresponding insulators independently of one another from the support member to thereby separate from each other by an optimized separation distance the distal ends of each insulator. When the corresponding sub-conductors of the single phase bundle are releasably coupled to the corresponding distal ends of the insulators the surge impedance loading of the single phase bundle may be improved by separation of the corresponding distal ends of the insulators and the sub-conductors by the optimized separation distance.

7 Claims, 18 Drawing Sheets

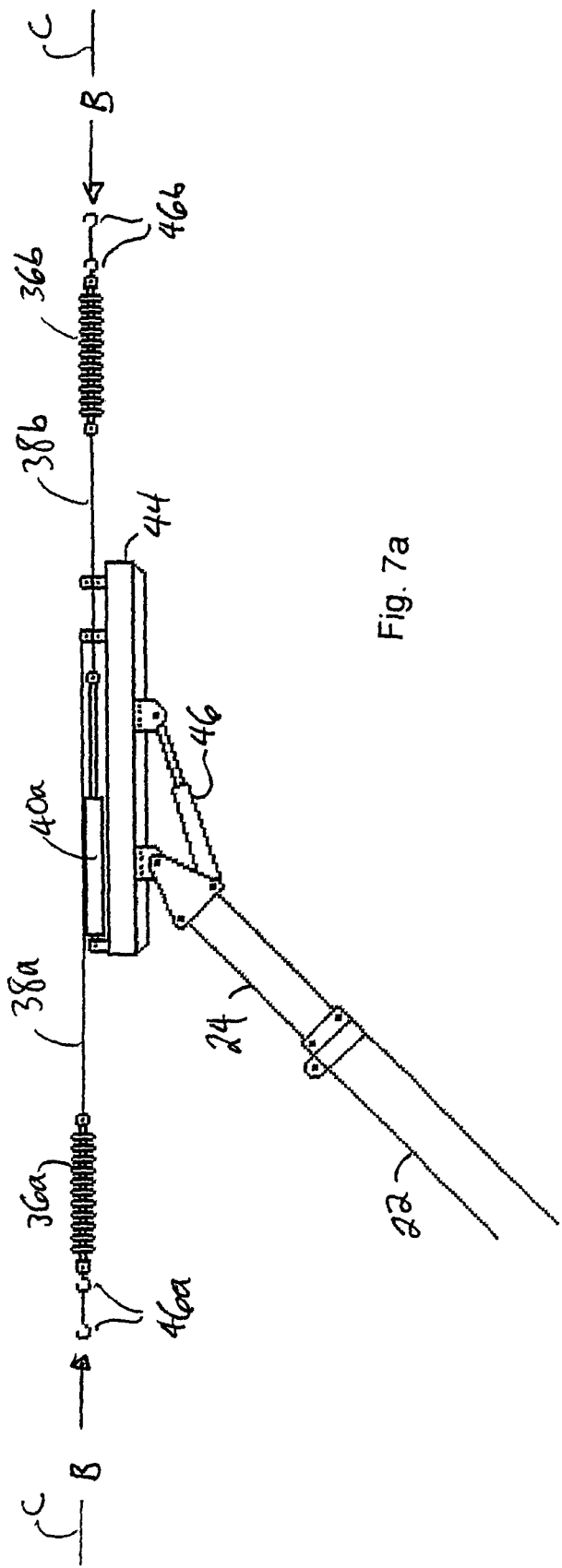
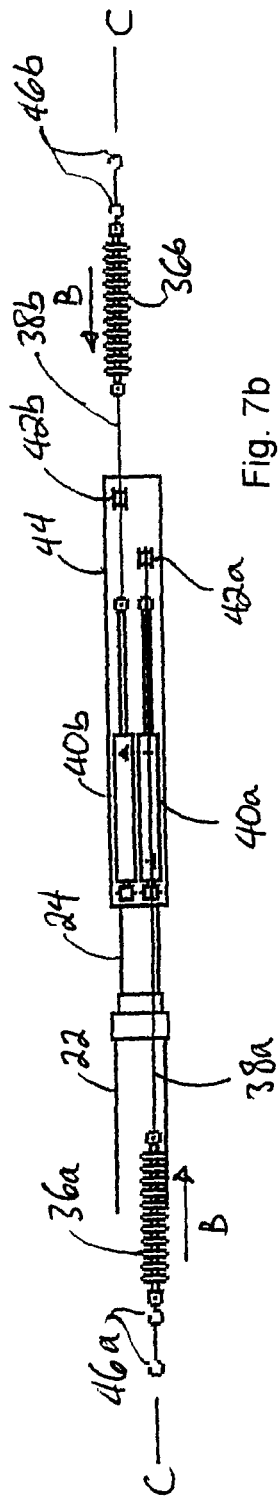
Fig. 7a
Fig. 7b

REMOTE MANIPULATOR FOR MANIPULATING LIVE MULTIPLE SUB-CONDUCTORS IN A SINGLE PHASE BUNDLE

FIELD OF THE INVENTION

This invention relates to a device which is attached to the boom of a crane or similar device, and the corresponding method for the precise and remote manipulation of live sub-conductors in a single phase bundle of an energized overhead high voltage transmission line.

BACKGROUND OF THE INVENTION

As we describe in our U.S. Pat. No. 5,538,207, which issued Jul. 23, 1996 for our Boom-Mountable Robotic Arm, high voltage transmission and distribution lines are typically strung between a series of spaced-apart support structures or poles. The conductors are connected to insulators mounted on or suspended from cross arms extending at the upper end of transmission or distribution poles, or conductor support points built into transmission structures. Periodically it is necessary to replace or repair the poles or structures, cross arms and insulators to maintain the electrical circuit in good working order. It is preferable if this maintenance and repair work can be performed without de-energizing the conductors in order to avoid an interruption of service to consumers, or to avoid the necessity of purchasing power from an alternative source, or other system disruptions.

Hot line repair work is a potentially hazardous undertaking. Safety regulations require that linemen maintain a minimum work clearance or "limit of approach" from energized conductors. The limit of approach varies depending upon the voltage of the conductors in question.

Conventional procedures used by linemen to temporarily support energized conductors in order to enable repair of damaged or obsolete components involve the use of insulated wire tongs, lift poles and rope blocks in labour-intensive, complex rigging arrangements. Conventional fiberglass insulated tools are limited to use only in good weather. Any accumulation of moisture which may impair their insulating property requires that the job be stopped, and that the conductors be placed in an insulator which is rated for all-weather use.

Fujimoto in U.S. Pat. Nos. 5,107,954 and 5,183,168 which issued respectively on Apr. 28, 1992 and Feb. 2, 1993 describes an operator cabin mounted on the distal end of a vertical mounted boom, the operator cabin having at least one manipulator operatively connected to the front side of the cabin. A pair of manipulators are illustrated. The manipulators are adapted to manipulate electrical components while energized. In applicants view the device of Fujimoto appears to be limited to electric components having a relatively lower voltage, for example, 46 kV and below.

Several auxiliary cross arms have also been proposed in the past for temporarily supporting conductors, thereby reducing the need for labour-intensive "stick work" by linemen. For example, U.S. Pat. No. 4,973,795, which issued to Sharpe on 27 Nov. 1990, relates to an auxiliary cross arm consisting of an insulated boom fitted with polymer insulators and conductor hooks for releasably engaging energized conductors. The Sharpe boom is suspended from a crane above the transmission lines to be serviced.

Auxiliary cross arms for temporarily lifting and supporting energized conductors from below are also well known. Such cross arms typically have sleeves which are connectible to the boom jibs of derrick or bucket trucks.

As we also describe in our U.S. Pat. No. 6,837,671, which issued Jan. 4, 2005 for our Apparatus for Precisely Manipulating Elongate Objects Adjacent to and such as Energized Overhead High Voltage Transmission Lines, the replacement and installation of cross arm members or insulators on overhead transmission towers is generally accomplished, whenever possible, while the electrical transmission lines are energized. It is common to find several rows of transmission structures supporting two or more vertically separate electrical transmission lines located in relatively close proximity. This confined overhead working area emphasizes the need for the precise elevating and manipulation of objects so as to avoid accidental arcing between the energized lines and the object with obvious dire consequences to workmen and machinery. A convenient practice is to employ a helicopter to elevate such objects to workmen on the tower. However, where a structures supports vertically separated energized lines, wind gusts and rotor downwash make this practice difficult and may require the de-energizing of a portion of the electrical transmission line. Such de-energizing is undertaken only as a last resort.

As we also describe in our published U.S. patent application Ser. No. 10/927,467, published under Publication No. 2005/0133244A1 on Jun. 23, 2005 for Live Conductor Stringing and Splicing Method and Apparatus, typically, alternating current is generated in a three-phase configuration. The three phases, B phase and C phase are all transported over separate conductors. Each such separate single phase conductor may be referred to in the industry as a phase. It is appreciated by one skilled in the art, that in some systems, more than one conductor (referred to herein as sub-conductors) carries the power load for a particular phase. This may be done in instances when a load is greater that a single conductor can accommodate. In such cases multiple (bundled) sub-conductors are often located next to each other and may hang from the same insulator as shown herein in FIG. 1. The conductors may be separated by spacers. Single insulators may be configured to carry double sub-conductors, two sub-conductors per phase, under a single yoke plate attached to the insulator.

Power lines consist of one, two or three phase systems. Each phase is electrically different from the other, that is they are at different electrical potentials. For example: in a simple house circuit of 120/240 volts, you have 3 wires (or conductors), two phase wires and a neutral or ground wire. The voltage or potential difference between the two phase wires and the neutral is 120 volts and the difference between the two phase wires is 240 volts. This is a two phase system. In a single phase system you have two wires or conductors, one at an electrical potential and the other at ground or neutral potential. In a three phase system there are three wires all at a different electrical potential from the other. Some systems may have a fourth ground or neutral wire which is electrically at the same potential difference from the phases or three wires.

Conductors are the wires or power lines in a power system. Each phase of a power line may consist of 1, 2, 3, 4 or 6 wires or conductors which are referred to as sub-conductors. Each sub-conductor is at the same electrical potential as the others regardless of the number of sub-conductors. Generally sub-conductors are used at the higher voltages (EHV) up to 765 kV and are larger and heavier.

SUMMARY OF THE INVENTION

It has now been found to be desirable in some circumstances, and it is an object of the present invention, to provide or attain higher surge impedance loading (SIL) on overhead lines. To accomplish this it is advantageous to increase bundle spacing. It may also be advantageous to decrease phase spacing. It is also been proven that on two bundle lines, tipping the bundle (adjusting the height of the sub-conductors so that they are not at the same elevation) lowers the chances of line galloping or vibration, thus reducing conductor damage.

The overhead lines studied for improving SIL were of the flat configuration. That is, the phases were supported from the tower by for example an I-I-I or I-V-I insulator configuration at typical distances of 9 to 10 m apart. This is referred to as the phase-to-phase spacing.

Methods to decrease the phase-to-phase spacing may involve the use of interphase spacers or insulators, originally developed to counter conductor galloping normally associated with ice forming onto conductors and responsible for setting up large conductor movement. No modification or alteration to the tower is necessary as the interphase spacer is installed in the middle of the span some 10 m away from the tower. In one embodiment of the present invention, the apparatus provides for adjusting the horizontal spacing of insulators so that the phase spacing may be adjusted.

Increasing the bundle spacing may involve mainly hardware modifications to the line material that attaches the conductor to the insulator. An example of a group of lines which may benefit from improved SIL performance includes a typical turn conductor configuration in a horizontal arrangement spaced apart by a typical distance of 380 mm (15 inches) apart by a yoke plate. Two examples for improving the spacing between the sub-conductors of a phase include, firstly, dropping one conductor by introducing an extension link between the yoke plate and the suspension clamp to space the conductors apart, for example, 700 mm (23 inches). The other example involves a bigger yoke plate to space the conductors apart horizontally a distance of, for example, 700 mm. The present invention assists in achieving an increased somewhat optimized spacing between conductors for improved SIL performance.

It is difficult to achieve such spacing by adjusting the level of the bundle using a prior art single point conductor lifter. Because the conductor bundles are mounted at opposite ends of a yoke plate, itself mounted to an insulator at a single central point, the weight of both bundles has to be simultaneously supported to keep the yoke plate from pivoting or twisting or binding on the insulator and thereby possibly damaging it.

In summary, the remote manipulator according to the present invention for separating multiple sub-conductors in an energized single phase bundle, may be characterized in one aspect as including a rigid support member such as a boom extension mountable on the end of a boom and at least first and second actuators mounted on the support member, wherein each actuator is independently actuable of the other. An insulator or insulators are mounted on each actuator. A selectively releasable coupler is mounted on each insulator for selectively releasable coupling of each insulator to a corresponding sub-conductor in a live or energized single phase bundle of sub-conductors. The actuators are arranged so as to, when selectively actuated by actuation means such as a hydraulic circuit, extend corresponding insulators independently of one another from the support member to thereby separate from each other by an optimized separation distance the distal ends of each insulator. When the corresponding sub-conductors of the single phase bundle are releasably coupled to the corresponding distal ends of the insulators the surge impedance loading of the single phase bundle may be improved by separation of the corresponding distal ends of the insulators and the sub-conductors by the optimized separation distance.

In one embodiment each actuator actuates a corresponding insulator linearly along a linear actuation trajectory. Each actuator may be mounted on a common base which is itself mounted on the support member. The actuation trajectories may be parallel. The base may be selectively pivotally mounted on the support member and selectively pivotable relative thereto by actuation of a selectively actuable pivoting means. For example, an actuator such as a hydraulic cylinder may pivot the base about a pivot point or fulcrum on the end of the support member. The base may for example be an arm cantilevered from the end of the support, a mounting bracket supporting the actuators and corresponding insulators symmetrically about the pivot point, or other structural embodiments stably holding the actuators for accurate position of the distal ends of the insulators with their sub-conductor couplers.

The actuation trajectories extend linearly upwardly or downwardly from the support and the base in which case the optimized separation distance may be a substantially vertical spacing between the corresponding separated sub-conductors. Alternatively the actuation trajectories may be substantially horizontal in which case the separation is also horizontal.

In one embodiment the actuators include corresponding prime movers such as hydraulic cylinders mounted to the base and include distal ends which are flexible members such as cables extending from the prime movers. The flexible members may extend horizontally and/or depend downwardly from the base along the actuation trajectories. The prime movers of the actuators may be mounted substantially horizontally along the base, in particular where the base is an elongate arm. That is, in one embodiment the hydraulic cylinders are mounted along the arm so as to be substantially parallel to a longitudinal axis of the arm, the insulators may be elongate and depend from the distal ends of the flexible members so as to hang downwardly lengthwise substantially co-axially with flexible members, for example the cables.

In one embodiment, the actuators are hydraulic cylinders mounted so as to extend substantially vertically upwardly for releasable engagement with the corresponding sub-conductors positioned above the base. The insulators may be elongate and are rigidly mounted to distal ends of the actuators and are actuable so that longitudinal axes of the insulators extend substantially along the linear actuation trajectories. Advantageously, a lateral spacing along the base between the actuators is substantially equal to the lateral spacing between the corresponding sub-conductors in the single phase bundle.

In use the apparatus according to the present invention for separating multiple sub-conductors in a live single phase bundle, includes a method comprising:

a) providing a rigid support member mountable on the end of a boom b) providing at least first and second actuators mounted on the support member, wherein each actuator is independently actuable, c) providing an insulator mounted on each actuator and a selectively releasable coupler mounted on each insulator for selectively releasable coupling of each insulator to a corresponding sub-conductor in a live single phase bundle of sub-conductors, d) arranging the actuators and actuating the actuators by actuation means so as to extend corresponding insulators independently of one another from the support member, e) releasably coupling to the distal ends of each insulator the corresponding sub-conductors of the live single phase bundle, and f) separating from each other by an optimized separation distance distal ends of the each insulator, so as to improve the surge impedance loading of the single phase bundle by separation of the corresponding distal ends by the optimized separation distance.

The method may also include the steps of:

g) providing that each actuator actuates a corresponding insulator linearly along a linear actuation trajectory and that the actuation trajectories for each actuator are parallel, h) of providing a common base and that each actuator is mounted on the common base and the base is mounted on the support member and providing that the base is selectively pivotally mounted on the support member and providing a selectively actuable pivoting means for pivoting the base support member i) orienting each actuator so that the actuation trajectories extend upwardly, downwardly or horizontally from the support and the base, wherein the optimized separation distance is the spacing between the corresponding separated sub-conductors, j) laterally spacing the actuators along the base so that the lateral spacing between the distal ends of the actuators is substantially equal to lateral spacing between the corresponding sub-conductors in the single phase bundle.

BRIEF DESCRIPTION OF THE DRAWINGS

FIG. 4b is, in partially cut away end elevation view, the embodiment of FIG. 4a.

FIG. 4c is, in top view, the embodiment of FIG. 4a.

FIG. 5e is, in end elevation view, the embodiment of FIG. 5a.

FIG. 6d is a section view along lines 6d-6d in FIG. 6a.

FIG. 6e is, in side elevation view, the boom extension of FIG. 6a.

FIG. 7a is, in side elevation view, a further alternative embodiment according to the present invention.

FIG. 7b is, in top view, the embodiment of FIG. 7a.

DETAILED DESCRIPTION OF EMBODIMENTS OF THE INVENTION

Figure 1:
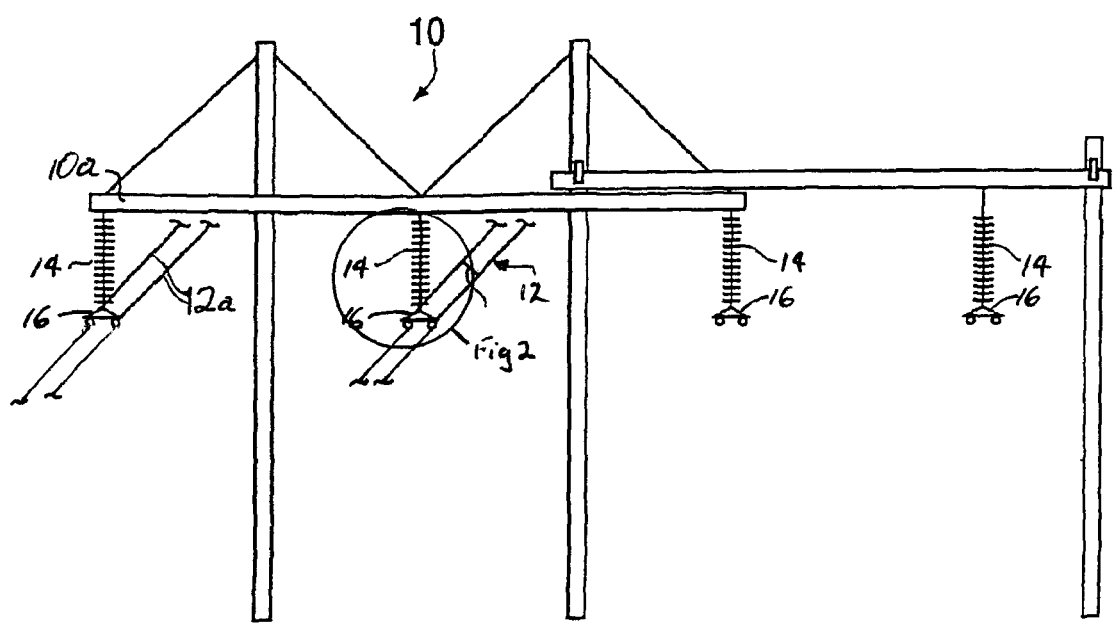
FIG. 1 is a partially cut away illustration of prior art overhead transmission line structure.
Figure 2:
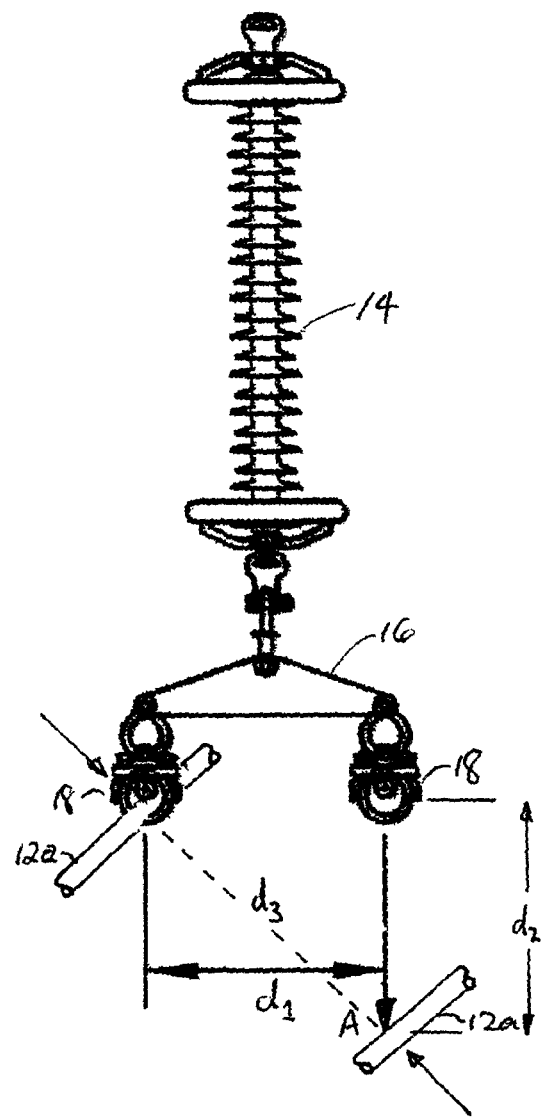
FIG. 2 is an enlarged view of a single insulator mounted yoke plate supporting two sub-conductors from the view of FIG. 1.

In the accompanying drawing figures, similar characters of reference denote corresponding parts in each view. As shown in the prior art, it is known in the prior art to suspend from structures 10 energized, that is, electrically live, overhead transmission lines 12 by means of conventional insulators 14 suspended so as to depend downwardly from the cross arms of the towers. Often, within a single phase bundle, the single phase will be carried by multiple sub-conductors 12a. Conventionally, a pair of such sub-conductors 12a will be supported from a cross arm 10a by yoke plate 16, better seen in FIG. 2, itself suspended by a insulator(s) 14.

Figure 2A:
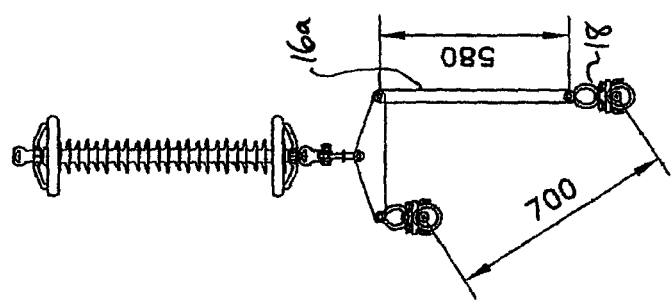
FIG. 2a is the view of FIG. 2 with the right hand sub-conductor lowered and a fixed rigid link inserted between the lowered sub-conductor and the yoke plate so as to increase the spacing between the suspension clamps.

The capacity of the single phase bundle may be improved if the surge impedance loading can also be improved. The surge impedance loading can be improved by increasing the spacing between sub-conductors 12a, for example, increasing the separation distance $d_1$ between sub-conductors 12a suspended by couplings such as suspension clamps 18 from yoke plate 16. One way to increase the spacing between the sub-conductors 12a suspended on yoke plate 16, is to drop one of the sub-conductors for example in direction A in FIG. 2 so as to lower the right hand sub-conductor 12a by distance $d_2$. The resulting separation between the left and right sub-conductors 12a is a separation of distance $d_3$. Thus where the lateral spacing provided by a conventional yoke plate 16 is approximately 380 millimeters (15 inches) between couplers 18, so that distance $d_1$ is 380 millimeters, lowering the right sub-conductor 12a in direction A by a distance $d_2$ of approximately 580 millimeters, results in a separation between the left and right sub-conductors 12a by a distance $d_3$ of approximately 700 millimeters (23 inches). As seen in FIG. 2a a fixed rigid link 16a may be inserted between the yoke plate and the lowered coupler 18 to maintain the separated spacing between the sub-conductors. The present invention provides for increasing the separation between the sub-conductors from distance $d_1$ to distance $d_3$ in the illustrated example, which is not intended to be limiting but rather which exemplifies how one solution according to the present invention may be implemented.

Figure 3A:
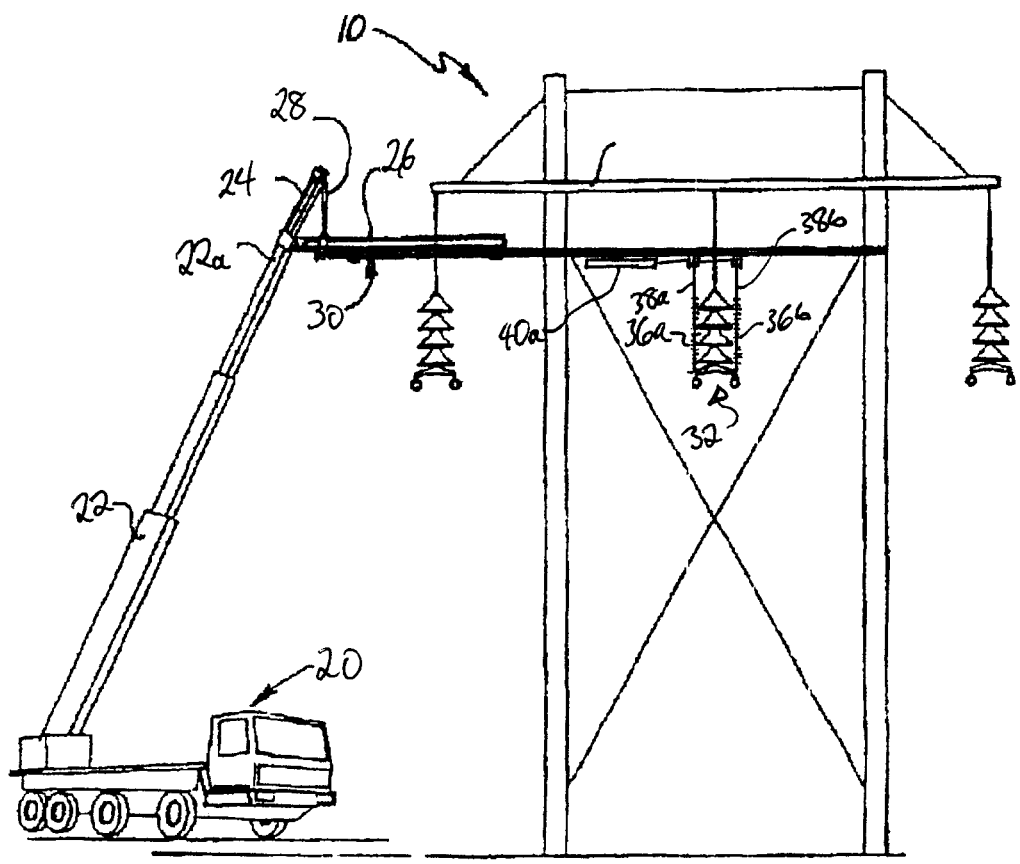
FIG. 3a is one alternative embodiment according to the present invention, with the sub-conductor lines not illustrated, in preparation for adjusting the spacing between the pair of sub-conductors in the center phase.
Figure 3B:
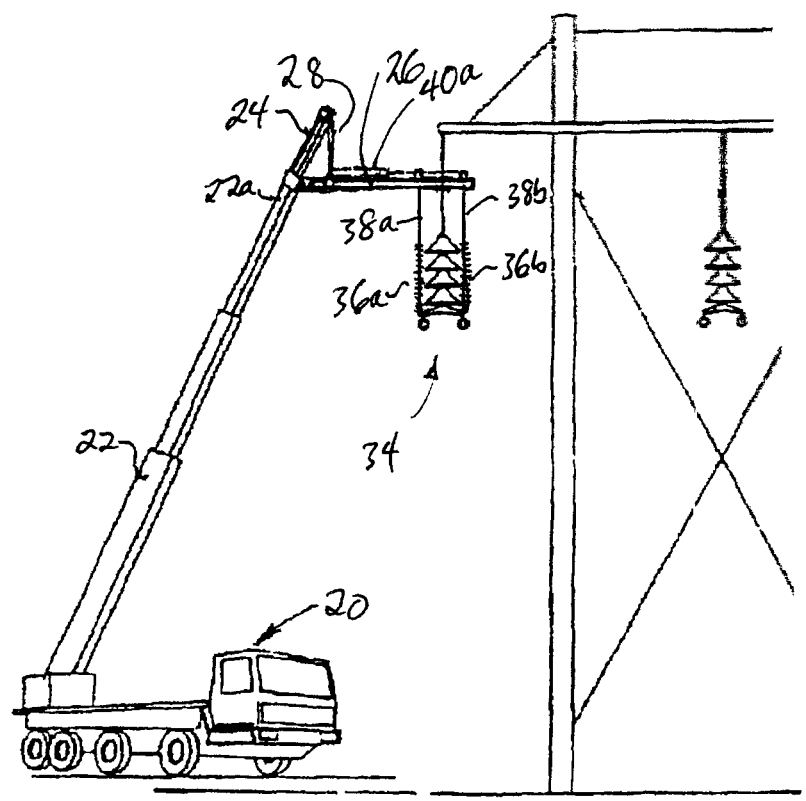
FIG. 3b is the view of FIG. 3a in an embodiment of the present invention operating on an outside phase.

As seen in FIGS. 3a and 3b, in implementing the method and apparatus according to the present invention, a conventional vehicle 20 having a telescoping boom 22 may be parked adjacent to the structure 10. An insulated boom extension 24 may be mounted to the distal end 22a of boom 22. Insulated boom extension 24 is alternatively referred to herein as a rigid support member although it is not intended that the meaning of the term rigid support member is to be limited to meaning solely an insulated boom extension as other support means mounted to the end 22a of boom 22 will work.

A pivotable base, illustrated in FIGS. 3a and 3b as a cross member 26, is pivotally mounted to boom extension 24 for pivoting relative thereto upon actuation of an actuator such as hydraulic cylinder 28 mounted so as to extend between boom extension 24 and cross member 26. A rigid cantilevered extension arm 30 may be mounted to cross member 26 where it is required to reach for example a center single phase bundle 32 suspended from the structure 10. As seen in FIG. 3b, in order to reach single phase bundle 34, extension 30 is not required.

In the illustrated embodiments of FIGS. 3a and 3b, which are not intended to be limiting, a pair of insulators 36a and 36b are suspended on corresponding cables 38a and 38b. The cables are attached to a pair of hydraulic actuators 40a and 40b, cable 38a being connected to actuator 40a, and cable 38b being connected to actuator 40b so that insulators 36a and 36b and their corresponding suspension clamps may be raised or lowered independently by actuation of their corresponding actuators 40a and 40b.

Figure 4A:
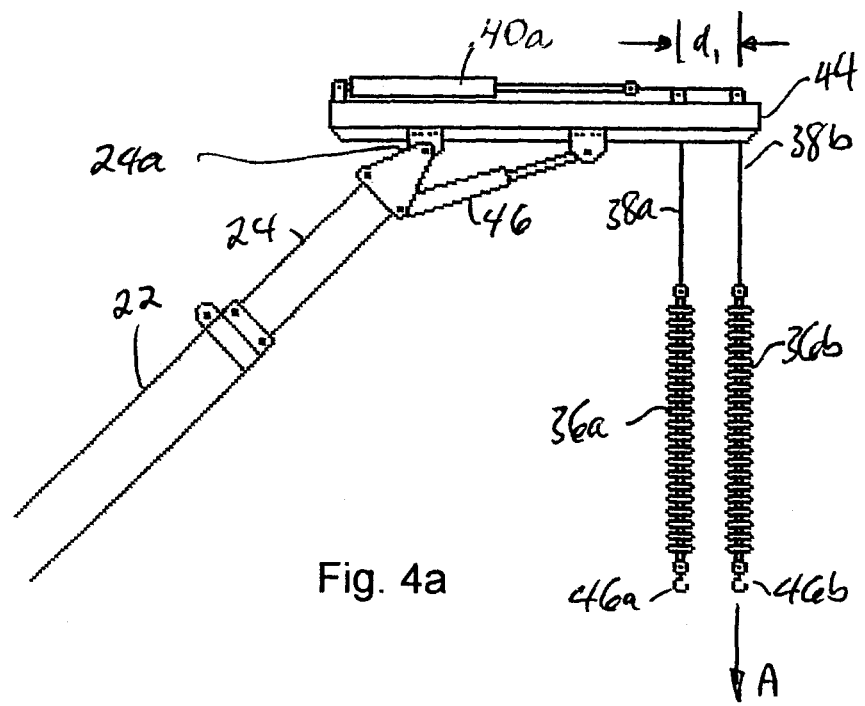
FIG. 4a is, in side elevation view, one embodiment of the present invention mounted onto the end of a boom.
Figure 4B:
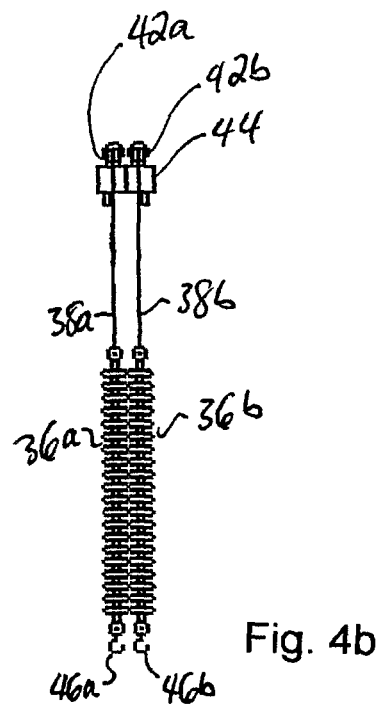
Figure 4C:
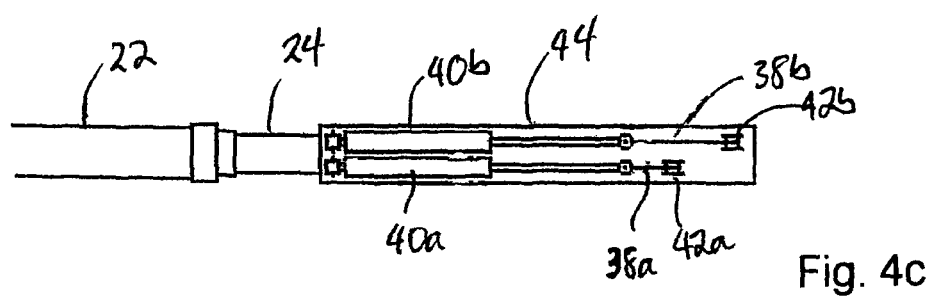

A corresponding embodiment, that is, where the insulators depend from cables connected to independently actuable hydraulic cylinders, is also seen in FIGS. 4a-4c. Again, insulator 36a is connected to its corresponding hydraulic cylinder 40a by a cable 38a, and insulator 36b is connected to its corresponding hydraulic cylinder 40b by cable 38b. Cables 38a and 38b depend from their corresponding idler rollers or pulleys 42a and 42b, themselves mounted, spaced apart along the distal end of a base member, in this case support arm 44. Idler pulleys 42a and 42b, and thus insulators 36a and 36b, are spaced apart on the end of support arm 44 by a distance substantially equivalent to distance $d_1$ so that, with boom extension 24 and support arm 44 positioned so that subconductor suspension clamps or couplers 46a and 46b mounted, respectively, on the lower ends of insulators 36a and 36b, may be connected to sub-conductors 12a held in couplers 18 on yoke plate 16. With the sub-conductors 12a coupled within couplers 46a and 46b so as to support the weight of the sub-conductors 12a, one of the sub-conductors such as the right sub-conductor in FIG. 2, may be uncoupled from its corresponding coupler 18. Its weight is taken up by its corresponding insulator and cable, in this instance insulator 36b and cable 38b, and the right sub-conductor lowered by actuation of cylinder 40b so as to extend the corresponding cylinder rod and thereby lower the right sub-conductor 12a by distance $d_2$. With the right sub-conductor 12a lowered by distance $d_2$ from yoke plate 16, a fixed extension bar or link 16a or the like may be installed between yoke plate 16 and the lowered sub-conductor 12a so that the sub-conductor may be supported in its lowered position to thereby maintain the somewhat optimized separation distance $d_3$ between the left and right sub-conductors 12a.

Figure 4D:
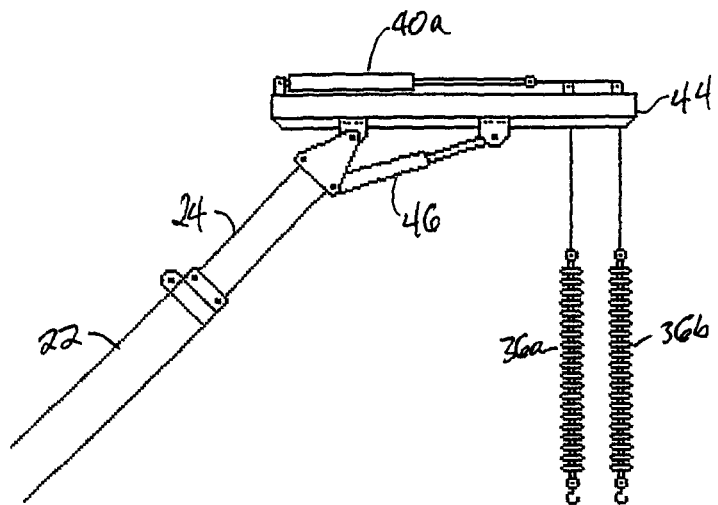
FIG. 4d is, in side elevation view, the embodiment of FIG. 4a with the actuators both fully extended.
Figure 4E:
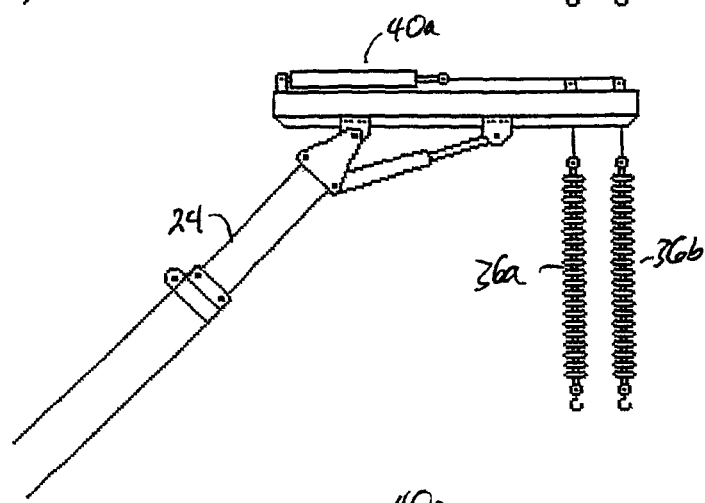
FIG. 4e is, in side elevation view, the embodiment of FIG. 4d with the actuators both fully retracted.
Figure 4F:
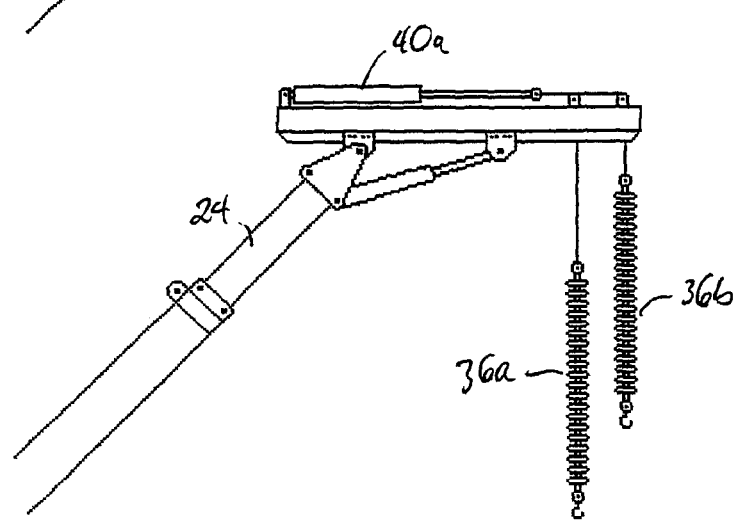
FIG. 4f is, in side elevation view, the embodiment of FIG. 4d with the near actuator fully extended and the far actuator fully retracted so as to raise the right insulator while leaving the left insulator lowered.
Figure 5A:
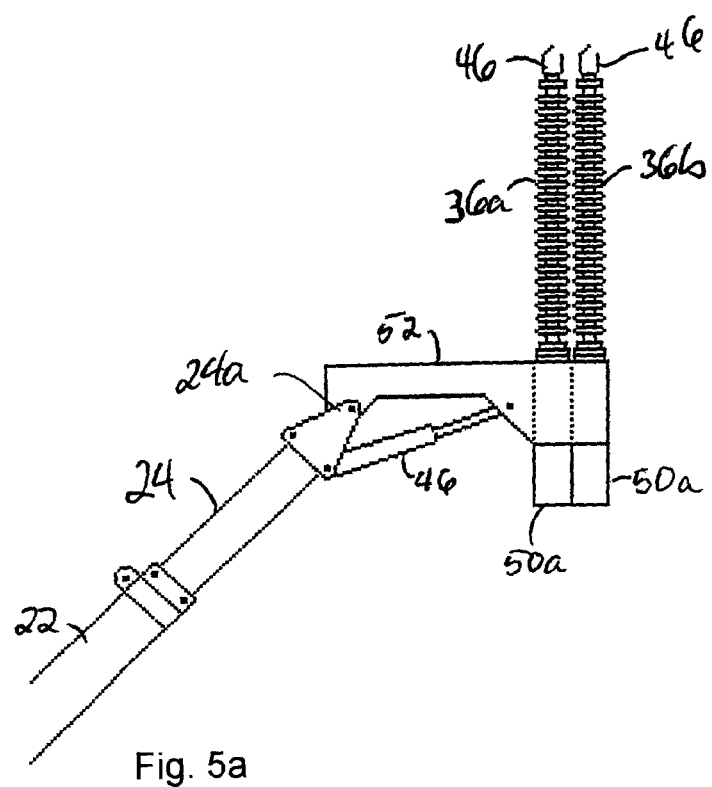
FIG. 5a is, in side elevation view, a further alternative embodiment of the present invention mounted onto the end of a boom.
Figure 5B:
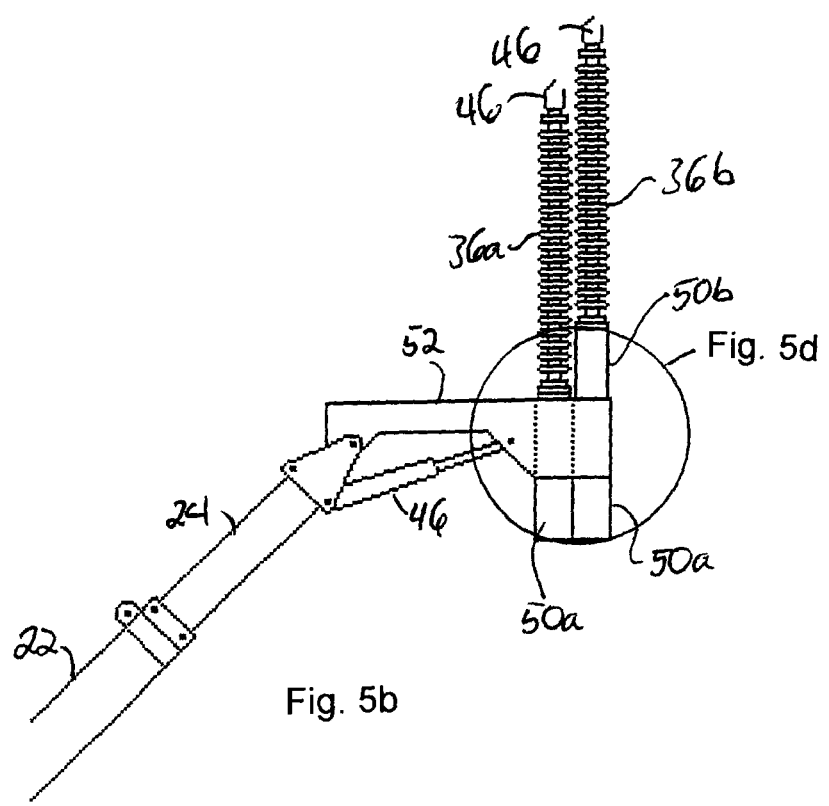
FIG. 5b is, in side elevation view, the embodiment of FIG. 5a with the right hand actuator extended so as to elevate the corresponding right hand insulator.
Figure 5C:
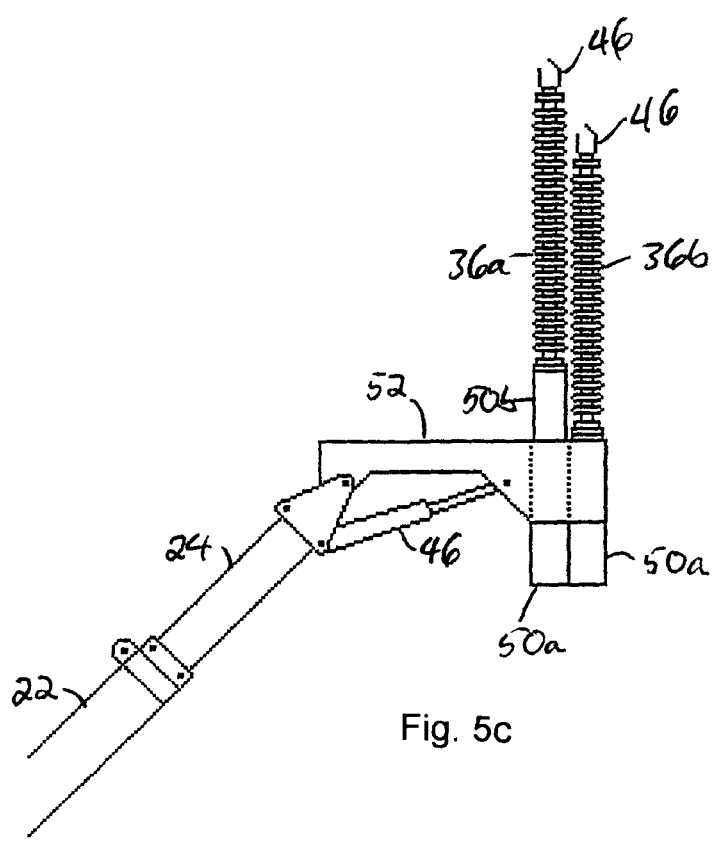
FIG. 5c is, in side elevation view, the embodiment of FIG. 5a with the left hand actuator extended and the right hand actuator retracted so as to raise the left hand insulator.
Figure 5D:
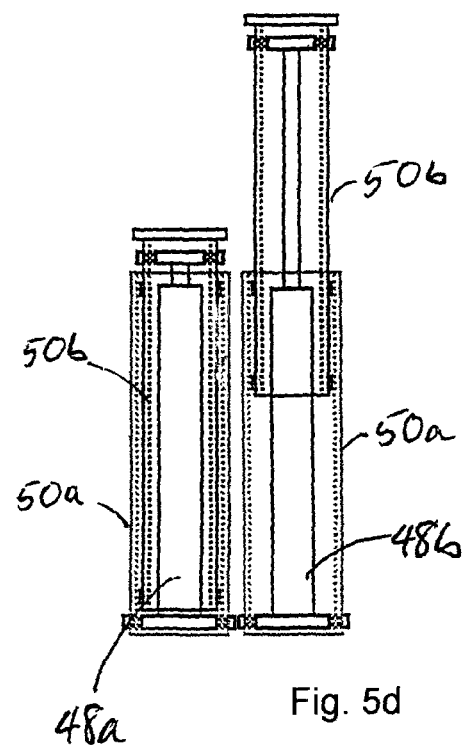
FIG. 5d is, in partially cut away partially exploded view, the left and right hand actuators of FIG. 5b in an enlarged view.
Figure 5E:
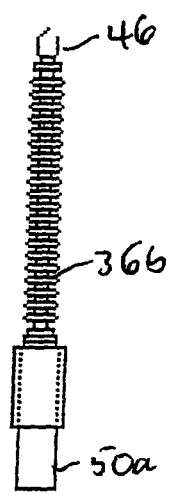

FIGS. 4d-4f illustrate that hydraulic cylinders 40a and 40b are independently actuable so that as seen in FIG. 4d both cylinders may be simultaneously actuated so as to extend their corresponding rods and thereby lower their corresponding insulators 36a and 36b, or may, as seen in FIG. 4e, be simultaneously retracted so as to simultaneously raise insulators 36a and 36b. As seen in FIG. 4f, and as already referred to in respect of FIGS. 4a-4c, actuators 40a and 40b may be independently actuated so as to independently raise or lower the corresponding insulators 36a and 36b, FIG. 4f illustrating insulator 36b raised by the retraction of cylinder 40b while leaving cylinder 40a extended and insulator 36a thus in its lowered position.

As in the embodiment of FIGS. 3a and 3b, in the embodiment of FIGS. 4a-4f, support arm 44 may be pivoted relative to boom extension 24. Support arm 44 is pivotally mounted on the distal end 24a of boom extension 24 so that its angular orientation in a generally vertical plane about end 24a may be adjusted by the selective actuation of hydraulic cylinder 46.

In the embodiment of FIGS. 5a-5e, instead of insulators 36a and 36b being selectively lowered and raised below a base member which is pivotally mounted to the support member on the boom, that is, support arm 44 pivotally mounted on boom extension 24, insulators 36a and 36b are mounted so as to be driven upwardly by hydraulic actuators 48a and 48b housed, respectively, in telescoping cylindrical housings or cylinders 50a and 50b. Each cylinder 50b is snugly nested within its corresponding cylinder 50a so that, as actuators 48a and 48b are actuated to extend or retract their corresponding rods, telescoping cylinder 50b is correspondingly extended or retracted so as to upwardly extend or retract the insulator mounted thereon. Cylinders 50a are mounted in or on the distal end of support arm 52. Like support arm 44, support arm 52 is pivotally mounted to boom extension 24 at end 24a and pivoted relative thereto by actuation of hydraulic cylinder 46.

Figure 6A:
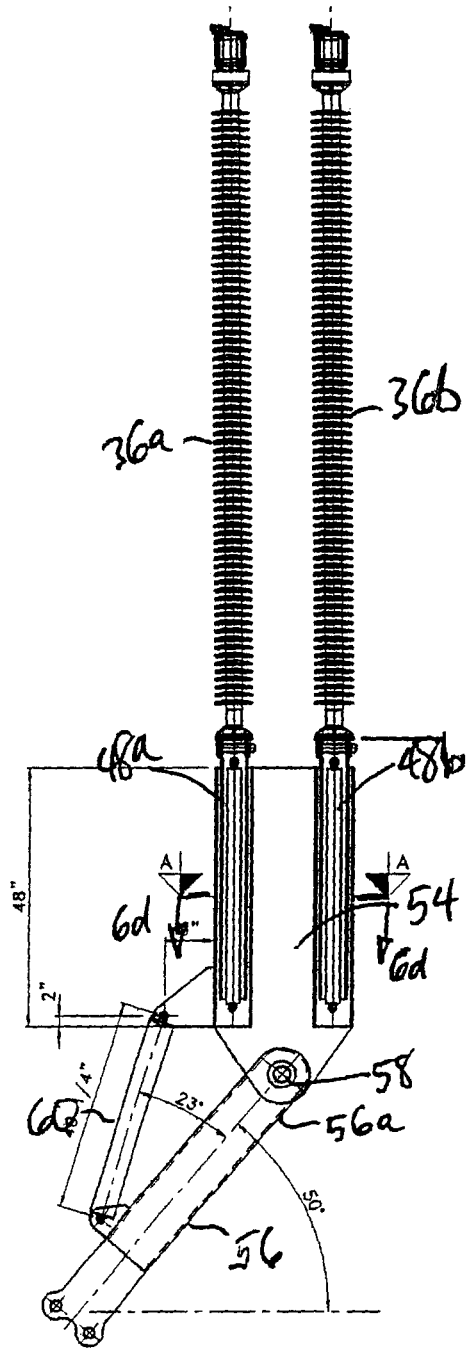
FIG. 6a is a further alternative embodiment according to the present invention in side elevation view.
Figure 6B:
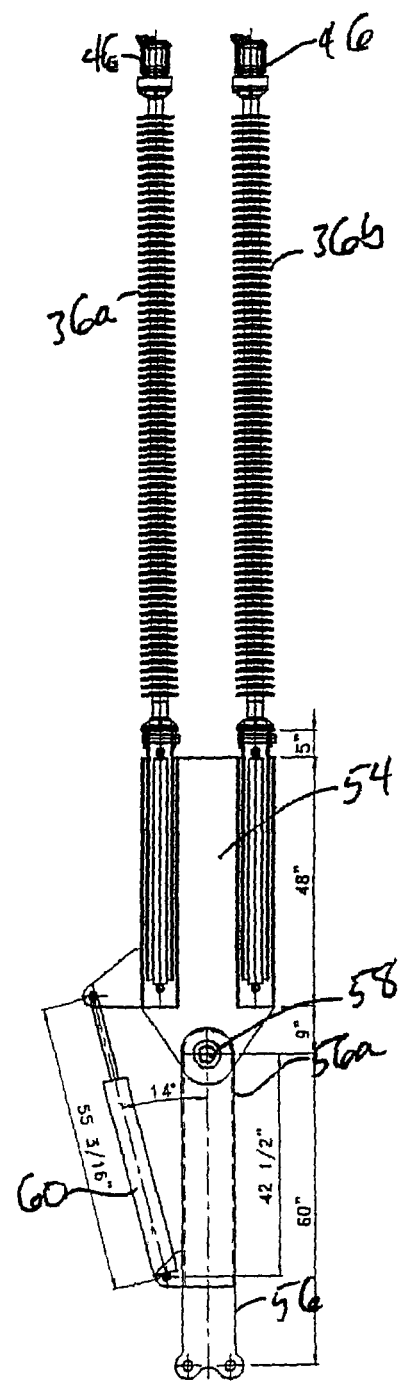
FIG. 6b is, in side elevation view, the embodiment of FIG. 6a with the actuator mounting bracket pivoted relative to the boom extension.
Figure 6C:
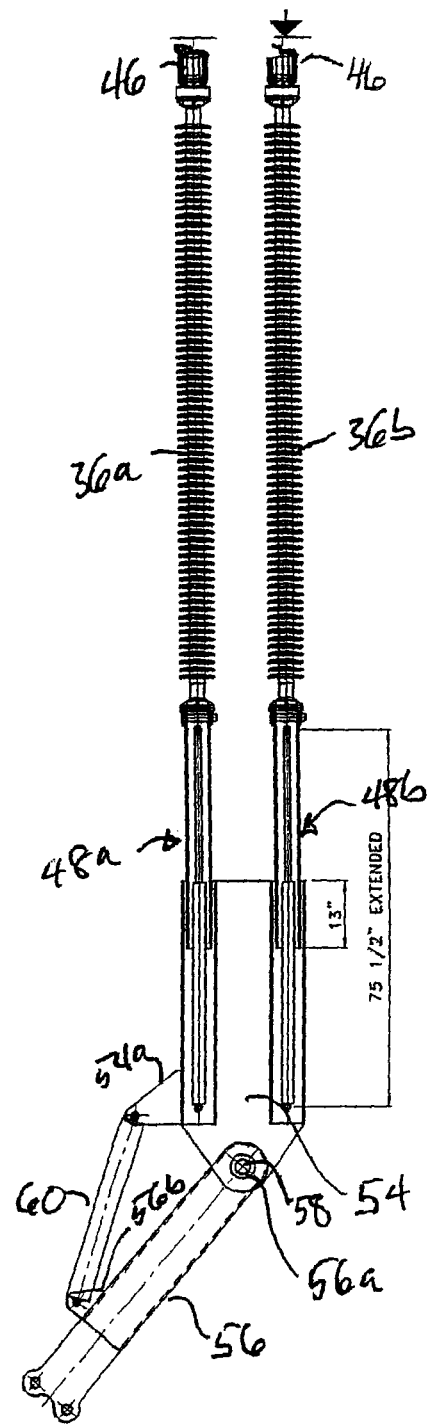
FIG. 6c is, in side elevation view, the embodiment of FIG. 6a with the left and right hand actuators fully extended so as to raise both the left and right hand insulators.
Figure 6D:
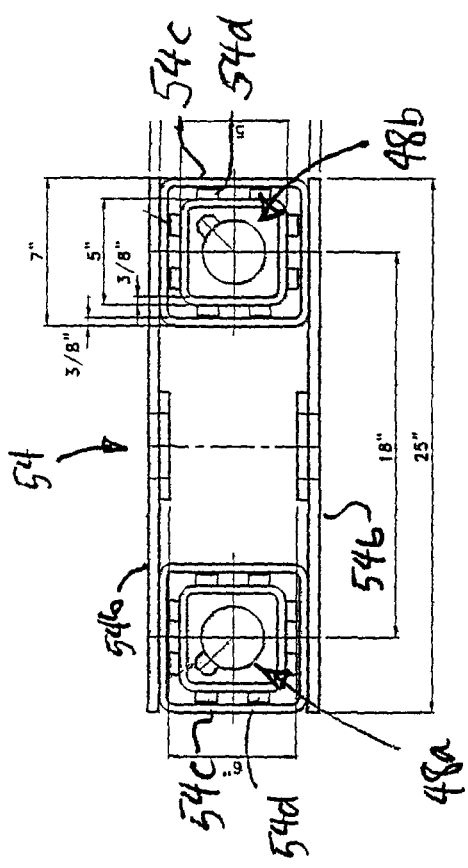
Figure 6E:
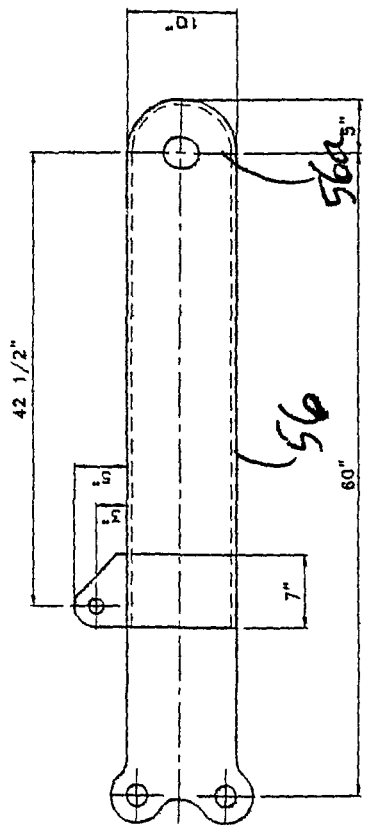

In the embodiment of FIGS. 6a-6e, the base member to which the insulators 36a and 36b and their corresponding hydraulic cylinders 48a and 48b are mounted is, rather than a cantilevered member such as support arm 52, a mounting bracket 54 supporting insulators 36a and 36b and their corresponding hydraulic cylinders 48a and 48b symmetrically at the base end of the cylinders on either side of the distal end 56a of boom extension 56. Mounting bracket 54 is pivotally mounted by means of shaft or pin 58 journalled through apertures in distal end 56a so that mounting bracket 54 may be pivoted relative to boom extension 56 by the operation of hydraulic cylinder 60. Hydraulic cylinder 60 is mounted at its ends to flanges 54a and 56b extending respectively from mounting bracket 54 and boom extension 56. As seen in FIG. 6d, mounting bracket 54 may be a sandwich of parallel plates 54b sandwiching therebetween a laterally spaced apart parallel pair of hydraulic cylinders 48a and 48b mounted within hollow tubular housings 54c and supported by guides 54d.

In use, as in the embodiment of FIGS. 5a-5e, the boom, boom extension and base member (the latter represented by support arm 52 in FIGS. 5a-5e, and mounting bracket 54 in FIGS. 6a-6e) are positioned underneath the energized single phase sub-conductor bundle. The insulators on their corresponding hydraulic cylinders are aligned by selectively pivoting the base relative to the support member, that is relative to the boom extension in the illustrated embodiments. Although the illustrations are limited to only two insulators on a corresponding pair of actuators so as to pick individual sub-conductors from only a suspended pair of sub-conductors, it is understood that within an energized single phase bundle of sub-conductors, there may be a plurality of sub-conductors and consequently two or more parallel insulators and their corresponding actuators may be mounted on the base so that actuation of the actuators drives the insulators and their corresponding sub-conductors when mounted in the couplers 46 generally vertically relative to one another to thereby adjust the spacing between for example all the adjacent sub-conductors. Thus with sub-conductors 12a mounted, one each, into couplers 46, and with one or more of the sub-conductors so held de-mounted from their support on towers 10, for example de-mounted from yoke plate 16, the position of one sub-conductor 12a may be held constant and the adjacent sub-conductor raised or lowered relative the other so as to increase the separation between the two to distance $d_3$. Once the desired separation distance is attained, the sub-conductor which has been removed from its original mount on the structure 10 is secured in its new position by for example, the mounting of a rigid link arm between the sub-conductor and original structure mounting point or the like. Once the sub-conductors have been re-secured, and in particular, the sub-conductor which has been raised or lowered from its original position has been re-secured to the structure 10 using a rigid link or arm, couplers 46 may be released and the insulators retracted for removal from proximity to the energized bundle. Thus as may be seen using the example of the yoke plate 16, even though only one sub-conductor of the pair of sub-conductors is being moved relative to the other, both sub-conductors are supported by couplers 46 on the corresponding insulators and hydraulic cylinders so as to avoid movement of the yoke plate relative to the corresponding insulator 14.

In the embodiment of FIGS. 7a and 7b the embodiment of FIGS. 4a-4f has been modified so as to pull sub-conductors 12a together to install spreaders or so that phase spacing may be adjusted by horizontally adjusting the position of insulators 36a and 36b. Thus for example if each hydraulic cylinder 40a and 40b had a stroke of three feet, then in the arrangement of FIGS. 7a and 7b where the cables are disposed in opposite directions around idler rollers or pulleys 42a and 42b, simultaneous actuation of both hydraulic cylinders provides for a take up of six feet in direction B, that is, coaxially with the longitudinal axis of the insulators and the corresponding hydraulic cylinders.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A method for separating multiple sub-conductors in a live single phase bundle, comprising the steps of:
   providing a rigid support member mountable on the end of a boom
   providing at least first and second actuators mounted on said support member, wherein each actuator of said at least first and second actuators is independently actuable,
   providing an insulator mounted on said each actuator of said at least first and second actuators and a selectively releasable coupler mounted on each said insulator for selectively releasable coupling of said each insulator to a corresponding sub-conductor in an energized single phase bundle of sub-conductors, wherein said each insulator has a distal end,
   arranging said at least first and second actuators and actuating by actuation means said at least first and second actuators so as to extend corresponding said insulators independently of one another from said support member,
   releasably coupling to the distal ends of said each insulator the corresponding sub-conductors of the energized single phase bundle,
   increasing the surge impedance loading of the single phase bundle by separating from each other by an optimized separation distance said distal ends of said each insulator.

2. The method of claim 1 further comprising the steps of:
   providing that said each actuator actuates a corresponding said each insulator linearly along a linear actuation trajectory and that said actuation trajectories for said each actuator are parallel.

3. The method of claim 2 further comprising the steps of providing a common base and that said each actuator is mounted on said common base and said base is mounted on said support member and providing that said base is selectively pivotally mounted on said support member and providing a selectively actuable pivoting means for pivoting said base support member.

4. The method of claim 3 further comprising the steps of orienting said each actuator so that said actuation trajectories extend upwardly from said support and said base, wherein said optimized separation distance is a substantially vertical spacing between the corresponding separated sub-conductors.

5. The method of claim 3 further comprising the steps of orienting said each actuator so that said actuation trajectories extend downwardly from said support and said base, wherein said optimized separation distance is a substantially vertical spacing between the corresponding separated sub-conductors.

6. The method of claim 3 wherein each of said actuators has a distal end, said method further comprising the steps of laterally spacing said actuators along said base so that the lateral spacing between the distal ends of said actuators is substantially equal to lateral spacing between the corresponding sub-conductors in the single phase bundle.

7. The method of claim 3 further comprising the steps of extending said actuation trajectories substantially horizontally from said base so that said optimized separation distance is a substantially lateral spacing between the corresponding separated sub-conductors in the single phase bundle.

* * * * *